United States Patent
Niu et al.

(10) Patent No.: US 9,662,729 B2
(45) Date of Patent: May 30, 2017

(54) LASER GUIDED NANO-BRAZING METHOD FOR REINFORCED ALUMINUM COMPOSITE MATERIAL HAVING HIGH VOLUME FRACTION SILICON CARBIDE PARTICLES

(71) Applicant: Henan Jingtai Areospace High-Novel Materials Technology Co., Ltd., Jiaozuo, Henan Province (CN)

(72) Inventors: Jitai Niu, Jiaozuo (CN); Dongfeng Cheng, Jiaozuo (CN); Zeng Gao, Jiaozuo (CN); Peng Wang, Jiaozuo (CN); Qiang Li, Jiaozuo (CN); Baoqing Zhang, Jiaozuo (CN); Erzhen Mu, Jiaozuo (CN); Sijie Chen, Jiaozuo (CN); Hengze Xian, Jiaozuo (CN); Gang Zeng, Jiaozuo (CN); Xitao Wang, Jiaozuo (CN)

(73) Assignee: Henan Jingtai Aerospace High-Novel Materials Technology Co., Ltd., Jiaozuo, Henan (CN)

( * ) Notice: Subject to any disclaimer, the term of this patent is extended or adjusted under 35 U.S.C. 154(b) by 382 days.

(21) Appl. No.: 14/409,777

(22) PCT Filed: Apr. 27, 2013

(86) PCT No.: PCT/CN2013/074839
§ 371 (c)(1),
(2) Date: Dec. 19, 2014

(87) PCT Pub. No.: WO2013/189206
PCT Pub. Date: Dec. 27, 2013

(65) Prior Publication Data
US 2015/0196965 A1    Jul. 16, 2015

(30) Foreign Application Priority Data

Jun. 20, 2012 (CN) .......................... 2012 1 0204398

(51) Int. Cl.
*B23K 31/02* (2006.01)
*B23K 1/005* (2006.01)
(Continued)

(52) U.S. Cl.
CPC .............. *B23K 1/0056* (2013.01); *B23K 1/19* (2013.01); *B23K 1/20* (2013.01); *B23K 26/0069* (2013.01);
(Continued)

(58) Field of Classification Search
CPC .. B23K 1/0056; B23K 35/0222; B23K 35/28; B23K 35/30; B23K 35/38; B23K 35/383;
(Continued)

(56) References Cited

U.S. PATENT DOCUMENTS 8,678,269 B2 * 3/2014 Chaumat et al. ...... B23K 31/02 228/121
2009/0014505 A1 * 1/2009 Cretegny et al. ...... B23K 1/005 228/248.1

FOREIGN PATENT DOCUMENTS

CN          102699465 A   * 10/2012  .......... B23K 1/0056

* cited by examiner

*Primary Examiner* — Kiley Stoner
(74) *Attorney, Agent, or Firm* — Novoclaims Patent Services LLC; Mei Lin Wong

(57) ABSTRACT

A laser guided nano-brazing method for a reinforced aluminum composite material having high volume fraction silicon carbide particles, comprising 4 steps: nanocrystallizing the surface of the reinforced aluminum composite material having high volume fraction silicon carbide particles, preparing solder material, assembling pieces to be soldered, and dual-beam laser brazing. The use of nano-technology for the brazing of reinforced aluminum composite material having high volume fraction silicon carbide particles, and the use of dual-beam laser technology for brazing temperature field control enhance the humidity during the brazing (Continued)

process of said material and filling ability of the solder material, and satisfy the strict requirements of electronic packaging.

19 Claims, 4 Drawing Sheets

(51) Int. Cl.
| | |
|---|---|
| *B23K 1/19* | (2006.01) |
| *B23K 1/20* | (2006.01) |
| *B23K 26/00* | (2014.01) |
| *B23K 26/06* | (2014.01) |
| *B23K 35/28* | (2006.01) |
| *B23K 35/30* | (2006.01) |
| *C22C 5/02* | (2006.01) |
| *C22C 18/00* | (2006.01) |
| *C22C 21/14* | (2006.01) |
| *C22C 21/16* | (2006.01) |
| *C22C 5/06* | (2006.01) |
| *B23K 35/38* | (2006.01) |
| *B23K 35/02* | (2006.01) |
| *B23K 103/16* | (2006.01) |

(52) U.S. Cl.
CPC ...... *B23K 26/0604* (2013.01); *B23K 35/0222* (2013.01); *B23K 35/28* (2013.01); *B23K 35/282* (2013.01); *B23K 35/286* (2013.01); *B23K 35/30* (2013.01); *B23K 35/3006* (2013.01); *B23K 35/38* (2013.01); *B23K 35/383* (2013.01); *C22C 5/02* (2013.01); *C22C 5/06* (2013.01); *C22C 18/00* (2013.01); *C22C 21/14* (2013.01); *C22C 21/16* (2013.01); *B23K 2203/16* (2013.01)

(58) Field of Classification Search
CPC .. B23K 26/0604; B23K 26/0069; B23K 1/20; B23K 1/19; B23K 35/282; B23K 35/3006; B23K 35/286; B23K 2203/16; B23K 1/005; B23K 1/0053; C22C 5/06; C22C 21/16; C22C 21/14; C22C 18/00; C22C 5/02
USPC .......................... 228/245–255, 122.1–124.7; 219/121.6–121.86
See application file for complete search history.

LASER GUIDED NANO-BRAZING METHOD FOR REINFORCED ALUMINUM COMPOSITE MATERIAL HAVING HIGH VOLUME FRACTION SILICON CARBIDE PARTICLES

CROSS REFERENCE OF RELATED APPLICATION

This is a national phase national application of an international patent application number PCT/CN2013/074839 with a filing date of Apr. 27, 2013, which claimed priority of a foreign application number 201210204398.1 with a filing date of Jun. 20, 2012 in China. The contents of these specifications, including any intervening amendments thereto, are incorporated herein by reference.

BACKGROUND OF THE PRESENT INVENTION

Field of Invention

The present invention relates to a laser induced nano-brazing method for reinforced aluminum matrix composite with high volume fraction of silicon carbide particulates.

Description of Related Arts

Reinforced aluminum matrix composite with high volume fraction of silicon carbide particulates, which has high specific strength, specific stiffness, dimensional stability, designability and excellent performance in resistance to abrasion, corrosion and radiation, is a new structural material which has the greatest application potential amongst the metal based composite materials and is widely used in different industries such as aerospace, automotive, instrumentation, electronic information and precision machinery. Reinforced aluminum matrix composite with high volume fraction (50%~70%) of silicon carbide particulates, which has a coefficient of expansion close to the low coefficient of expansion of glass and a hardness close to the high hardness of diamond, is unique and useful in electronic packaging and key components in aviation and aerospace industries. For examples, in the advanced early warning aircraft, fighter jets, large phased radar, spaceships, space stations, Chinese lunar-orbiting spacecraft Chang'e and satellites, and military equipment such as ballistic missiles, which are currently in urgent need of development in China's national defense, the radar core components—T/R signal transmission and high power module receiver chip has a sharp increase in demand. Because Kovar (Fe—Ni—Co) and traditional packaging materials such as W/Cu and Mo/Cu, which are used for module package housing for a long time, have large specific weight, involve complicate manufacturing process and high cost, these materials are far from suitability for the highly lightweight design requirements of aviation and aerospace structure. As a result, there is an urgent need of a new electronic packaging materials which has the three characteristics of low expansion, high thermal conductivity and lightweight. Reinforced aluminum matrix composite with high volume fraction of silicon carbide particulates is an ideal alternative for electronic packaging materials because not only its specific weight is ⅓ of Kovar while its expansion coefficient is close to ceramic substrate of packaged chip, its thermal conductivity is 10 times of that of Kovar.

Accordingly, there is a trend to use reinforced aluminum matrix composite with high volume fraction of silicon carbide particulates to replace the traditional packaging materials such as Kovar, W/Cu and Mo/Cu in aviation, aerospace and electronics industries. Because In the military equipment such as advanced early warning aircrafts, fighter jets, large phased radars, spacecraft, satellites, and ballistic missiles, since the number of electronic components being used is greatly increased, a decrease in weight will have an implication of an increase in flexibility and survivability in operation, a decrease in load of fuel and an increase in effective load, thereby resulting in significant saving for the country. As a rough estimate, an airborne warning and control system requires 40,000 unit of electronic package module, an interceptor fighter requires 1500 units, a communication satellite requires 1500~3000 units, a shipborne radar requires 15,000 units, and the demand is even greater in the future space station and spacelab. If all the T/R modules in the above-mentioned military equipment in our country are replaced by using reinforced aluminum matrix composite with high volume fraction of silicon carbide particulates, the demand will be extremely large and therefore its military and economic significance cannot be estimated. It is reasonable to conclude that using reinforced aluminum matrix composite with high volume fraction of silicon carbide particulates to replace the traditional packaging materials such as Kovar, W/Cu and Mo/Cu is a significant reform in upgrade and replacement of communication equipment products in aviation and aerospace industry in our country and has significant meaning to our country.

However, this type of new electronic packaging materials has a bottleneck technical problem, which is the problem of joint welding for encapsulation of outer casing of electronic modules. On one hand, the case cover and the case body has to be welded together. Meanwhile, overheating damage to the case bottom on which the chip is mounted has to be avoided during welding (The working temperature limit of the chip is only 170° C.). In addition, it is required that the passing of stringent tests of the welded joint for air tightness, shock vibration, moisture resistance and corrosion resistance can be ensured. The quality requirements are very strict and this is one of the recognized technical problem of the welding industry in our country and at international level at the moment.

The status of foreign research: There is no existing report in relation to welding of reinforced aluminum matrix composite with high volume fraction of silicon carbide particulates. The status of national research: Jitai Niu of Harbin Institute of Technology, funded by the National Nature Science Fund in 1989, because the first in the country to carry out the research on welding for aluminum matrix composite materials. Since the late 1990s, a number of college teachers and research students have made useful attempt on welding possibility of low volume fraction reinforced aluminum matrix composite from which the results show as follows: since there exists a great difference in physical and chemical properties between the enhanced phase and the aluminum matrix substrate, the use of fusion welding method to obtain high quality welded joint is extremely difficult and defects such as porosity, slag inclusion, loose connection and poor penetration will occur. At the same time, under the high temperature condition during the welding process, interface reaction between silicon carbide and liquid aluminum will occur and needle-shaped harmful compound of $C_3Al_4$ is produced. Connection is only possible by using Al—Si welding wire or dilution bath of matrix alloy welding wire, however, the result is that the major component in the weld seam becomes aluminum alloy instead of aluminum matrix composite materials and therefore the strength coefficient of the welding joint is very low. After a few years, Jitai Niu invented a fusion welding method with in situ synthesis and reinforcement of weld (Chinese Invention Patent Number: ZL200510010266.5) which can significantly increase the strength of the joint. However, this method is only applicable to low volume fraction (<20%) reinforced aluminum matrix composite material and is not applicable to high volume fraction (50%~70%) reinforced aluminum matrix composite material. In recent years, the team of Jitai Niu have invented diffusion welding, vacuum brazing, furnace brazing and resistance welding for reinforced aluminum matrix composite with high volume fraction of silicon carbide particulates and obtained a number of national patents. The team of Jiuchun Yan of Harbin Institute of Technology invented vibration welding and ultrasonic capillary welding and contributed to the new research idea of welding method. That said, the welding quality of electronic packaging for high end products which has very strict technological requirements is still not satisfactory. The major insufficiency is tightness of brazing joint and resistance against environmental conditions (crossover temperature, vibration, space radiation). In particular, these method fails to use in mass production and fails to achieve the technical requirement of stable production with high passing rate for quality control requirements. The fundamental reason is that a large number of SiC ceramic reinforced phase which contain ionic bond and covalent bond exist on the surface of the composite materials such that wetting by brazing filler with metal bond is very difficult and hence the brazing process is very difficult to carry out, thereby further studies for effective brazing process is required.

SUMMARY OF THE PRESENT INVENTION

Technical Problem

An object of the present invention is to solve the problem of welding for reinforced aluminum matrix composite with high volume fraction of silicon carbide particulates which has high temperature requirement for the process and the problem of poor weld quality, therefore providing a laser induced nano-brazing method for reinforced aluminum matrix composite with high volume fraction of silicon carbide particulates.

Solution to Technical Problem

An object of the present invention is to solve the problem of welding for reinforced aluminum matrix composite with high volume fraction of silicon carbide particulates which has high temperature requirement for the process and the problem of poor weld quality, therefore providing a laser induced nano-brazing method for reinforced aluminum matrix composite with high volume fraction of silicon carbide particulates.

According to the preferred embodiment of the present invention, a laser induced nano-brazing method for reinforced aluminum matrix composite with high volume fraction of silicon carbide particulates comprises the steps of:

(1) nanocrystallization a brazing surface of substrate of reinforced aluminum matrix composite with high volume fraction of silicon carbide particulates:

preparing a nanocrystalline layer on a brazing surface of an upper substrate and a brazing surface of a lower substrate respectively;

(2) preparation of brazing filler:

preparing a brazing filler which is a silver-based, an aluminum-based or a zinc-based brazing filler; wherein the silver-based brazing filler comprises 40~50 parts of Ag, 20~25 parts of Cu, 9~12 parts of In, 16~20 parts of Sn and 2~5 parts of Mg by weight; wherein the aluminum-based brazing filler comprises 20~25 parts of Cu, 3~8 parts of Si, 1~3 parts of Mg 0.5~2 parts of Ni and 65~80 parts of Al by weight; wherein the zinc-based brazing filler comprises 55~60 parts of Zn, 12~18 parts of Cd, 10~15 parts of Ag and 13~18 parts of Cu by weight;

(3) Assembly of object for brazing:

placing the brazing filler prepared by step (2) between the brazing surface of the upper substrate and the brazing surface of the lower substrate prepared by step (1) to form an object for brazing;

(4) Dual beam laser brazing:

Under the protection of argon atmosphere, converging the focus of two laser beams onto the object for brazing at a position which is 1~2 mm below the surface of the object for brazing, wherein a beam diameter of the laser beam is 0.5~1.5 mm and a distance between the beam center of the two laser beams is 2~5 mm; welding by the two laser beam simultaneously of which the welding speed is 15 mm/s~20 mms, wherein a power density of the laser beam at a front side is $10^2$ w/cm$^2$~$10^4$ w/cm$^2$ and a power density of the laser beam at a rear side is $10^5$ w/cm$^2$~$10^7$ w/cm$^2$, thereby the laser induced nano-brazing method for reinforced aluminum matrix composite with high volume fraction of silicon carbide particulates is achieved.

Advantageous Effect of the Present Invention

The followings are the innovative features of the present invention:

(1) Nano-technology is applied to brazing process of reinforced aluminum matrix composite with high volume fraction of silicon carbide particulates for the first time in our country and at international level;

(2) Dual laser beam technology is applied onto the control of temperature field for the brazing process, which creates a temperature gradient and a driving force for spreading of brazing filler such that the wetting ability of the brazing filler in the brazing seam. This technical route is not reported in our country or abroad;

(3) Academically, it is the first time to reveal the expression and behavior of nano effect on brazing process of composite materials and to investigate the microscopic mechanism and influence of brazing on composite materials under the combined action of laser and nano effect condition, which provide scientific contribution and development on the basic theory for welding process of composite materials;

(4) The view that the surface of silicon carbide particulates is semi-matalized by nano effect through which the enhancement of wetting ability of silicon carbide is facilitated by the brazing filler is proposed.

At present, researches on nano welding are mainly focused on microelectronics connection, coating of nano-layers on welding wire surface, nano sintering welding flux, lead-free nano welding paste and etc. There is no one on research studies of nano-brazing technology, or studies of the nano-brazing of reinforced aluminum matrix composite with high volume fraction of silicon carbide particulates. Theoretically, the advantages of nanotechnology on brazing process is that: (1) as the particle size of the nanoparticles decreases, the surface area increases and the number of surface atoms increases, which causes the unsaturated coordination of surface atoms occur and a large number of dangling bonds and unsaturated bonds is resulted, therefore the chemical activity of nanoparticles is increased and the wettability of the brazing process is increased; (2) as the particle size is decreased to nano level, the number of grain boundary serving as the channel for rapid atom diffusion is increased, therefore the diffusion rate of the atoms within the nano structure will be increased dramatically; (3) the existence of vibrational relaxation of the surface atoms, which causes an increase in vibrational amplitude and a decrease in vibrational frequency, will cause the crystalline structure will start to melt when the vibrational amplitude reaches 10~20% of lattice constant, therefore the melting point of the nano crystals is far below that of the block body and a brazing process at a lower temperature can be realized. Accordingly, bringing the nanotechnology into the research on brazing process of reinforced aluminum matrix composite with high volume fraction of silicon carbide particulates not only can increase the wettability of brazing filler on the surface of the composite materials, but also can decrease the brazing temperature as well as increase the atomic diffusion rate for facilitating the formation of an appropriate number of miscible, eutectic and permeable intermetallic compounds in the brazing seam, thereby dramatically increase the density of the brazing seam and the joint strength and is a relatively ideal welding method for reinforced aluminum matrix composite with high volume fraction of silicon carbide particulates. The attempt of the present invention has important theoretical and practical value in solving this worldwide technical problem of welding reinforced aluminum matrix composite with high volume fraction of silicon carbide particulates.

According to the present invention, the process of forming a nanocrystalline layer on the brazing surface of the reinforced aluminum matrix composite with high volume fraction of silicon carbide particulates can be carried out by mechanical polishing or high-speed projectile injection, which causes the huge proliferation of dislocation density on the material surface and hence movement and accumulation while the density of vacancies is also dramatically increased, therefore the material is divided and shred into a nanoscale structural morphology, or even into an amorphous state with irregular atomic arrangement in some places; the process can also be carried out by pulse laser shock such that the materials is caused to have 'explosive' vaporization in a short time and a great shock wave is formed from the atom surface, that this stress is far greater than the dynamic yield strength of the material and leads to strong microscopic plastic deformation on the material surface, hence increasing the dislocation density of the material and resulting the nanoscale structure.

It is well known that the wetting and spreading behavior of brazing filler at the joint portion is largely determined by temperature in view of time and space distribution. One of the greatest advantage of using laser as a heat source for brazing is that the energy input of laser can be precisely controllable. In order to further utilize laser beam to control the time and space distribution of temperature, the inventor employs a brazing process with two laser beams in which two laser beams are used at the same time to target on different area of the object for brazing so as to obtain a temperature gradient and a dynamic driving force at the joint portion such that the wettability of the brazing filler on the parent materials is increased. In addition, laser also has a special induced effect on materials. Pulsed laser ablation is used to pretreat the surface of parent material for brazing and nanocrystallizatin of the connecting surface can be achieved. Accordingly, the particle size of the material surface is decreased and the number of diffusion channel is increased such that uneven atomic steps are formed, which are particular suitable for atomic diffusion and increasing the capillary action for forming a dense brazed seam.

The two laser beams can be obtained by two independent laser emitting device or by splitting one laser beam. Referring to FIG. 1 of the drawings, a spectrophotometric system for dual beam brazing is illustrated. Through the use of beam splitter, reflective lens and focus lens, one beam is divided into two. The present invention employs a two beams system in which the two beams are used for heating at a front side and at a rear side at the same time and a predetermined distance is kept between the two beams. Also, light guiding system and optical components are employed for control and adjustment in such a manner that the laser beam at the front side is adjusted to a lower power while the laser beam at the rear side is adjusted to a higher power, thereby a certain level of temperature gradient is produced between the two beam spots of the front laser beam and the rear laser beam. The existence of temperature gradient can increase the driving force of the brazing filler on wettability of the parent materials, thereby further decrease the brazing temperature. Meanwhile, through the control of parameters and output power of laser, the temperature increase caused by the heat transfer from the brazing portion of an upper portion of a case body to area around a chip at a bottom portion of the case body is ensured to be controlled under the operation temperature limit of the chip and damage to the chip is prevented.

Under the induced heating of this kind of precision light source, the surface of parent materials has nano-organization and the nano effect on the brazing seam can be fully presented. The interactions between brazing filler and the parent materials which includes diffusion, inter-solubility and chemical activities are produced, therefore a high quality brazed joint is formed.

During the laser brazing process, an open-type argon gas protection system is employed in which argon gas is blown to the brazing portion; alternately, the laser brazing process can also be carried out inside an argon gas cabinet such that the brazing filler is protected from oxidation during the laser brazing process. The power, spot size and spot distance of the laser device is adjustable and controllable. Since the brazing filler is very thin and is placed between two pieces of objects for brazing, the chance of volatilization of metal vapor is very low even the brazing filler is melted. In addition, under the effect of argon gas flow, no harmful effect is caused to the focus system of the laser device.

According to the present invention, composite material science, nanotechnology and laser technology are integrated together in which the small size effect and the surface and interface effect (which increase the atomic diffusion rate) of nanotechnology is utilized, the precision heat source of laser beam which is capable of producing controllable temperature field is utilized such that a special effect of nanocrystallization on the surface of subject material is achieved while the wettability of the brazing process of reinforced aluminum matrix composite with high volume fraction of silicon carbide particulates as well as the filing capacity of the brazing filler are increased, thereby a brazed joint with high joint density and high bond strength is obtained and the stringent requirements of electronic packaging is fulfilled. According to the laser induced nano-brazing method for reinforced aluminum matrix composite with high volume fraction of silicon carbide particulates of this embodiment of the present invention, high temperature problem is not induced while the joints shear strength can reach approximately 260 MPa, thereby the welding requirements for electronic packaging or for other materials or products which contains a large number of ceramic phase and does not allow high welding temperature can be fulfilled.

The brazing method of the present invention is used for brazing reinforced aluminum matrix composite with high volume fraction of silicon carbide particulates.

Still further objects and advantages will become apparent from a consideration of the ensuing description and drawings.

These and other objectives, features, and advantages of the present invention will become apparent from the following detailed description, the accompanying drawings, and the appended claims.

DETAILED DESCRIPTION OF THE PREFERRED EMBODIMENT

Figure 1:
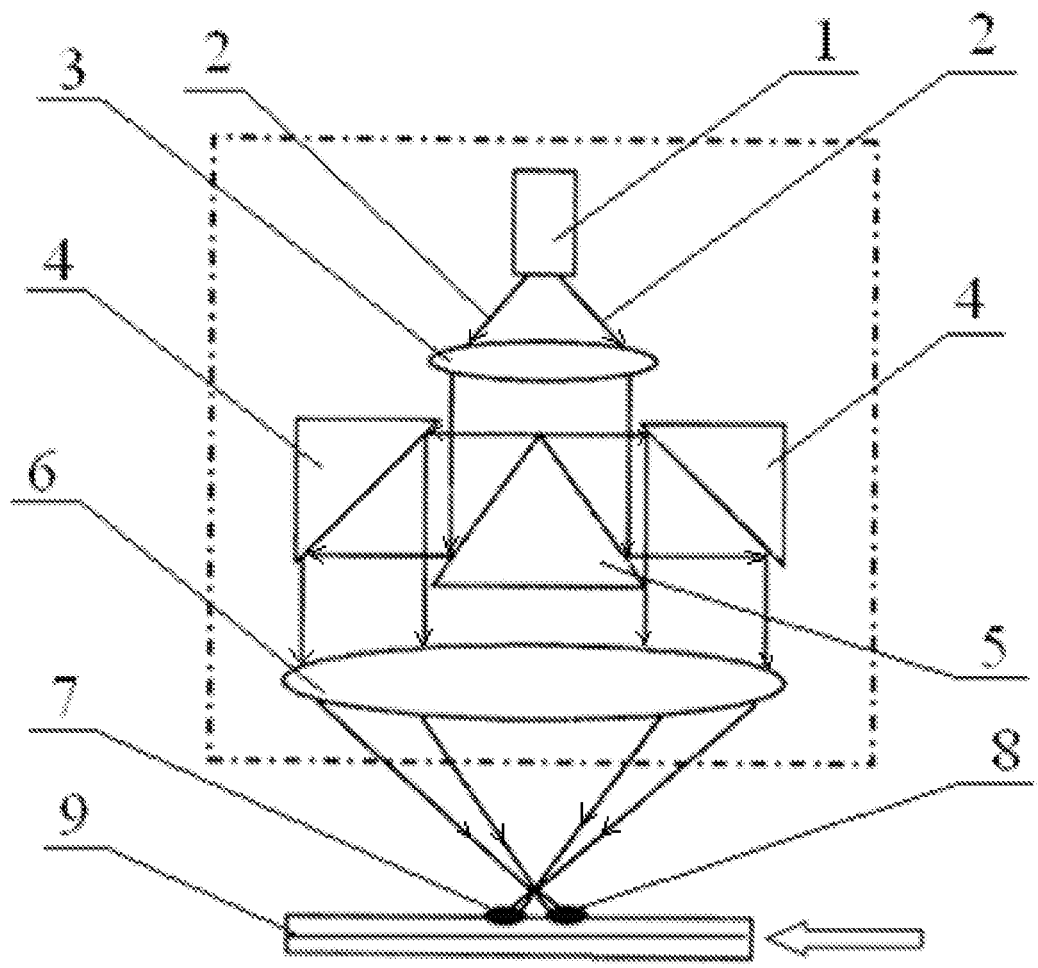
FIG. 1 is an illustration of a spectrophotometric system for dual beam brazing; wherein the numerical reference 1 refers to a laser device, 2 refers to laser beam, 3 refers to beam detector, 4 refers to reflective lens, 5 refers to beam splitter, 6 refers to focus lens, 7 refers to a low-power laser beam spot at the front side, 8 refers to a high-power laser beam spot at the rear side, 9 refers to an object for brazing, and the arrow indicates the direction of the laser beam.

The following description of preferred embodiments of the present invention is not intended to be limiting, and the present invention includes all combinations and modifications encompassed within the spirit and scope of the following embodiments.

Embodiment 1

According to this preferred embodiment of the present invention, a laser induced nano-brazing method for reinforced aluminum matrix composite with high volume fraction of silicon carbide particulates comprises the steps of:

(1) nanocrystallization a brazing surface of substrate of reinforced aluminum matrix composite with high volume fraction of silicon carbide particulates:

preparing a nanocrystalline layer on a brazing surface of an upper substrate and a brazing surface of a lower substrate respectively;

(2) preparation of brazing filler:

preparing a brazing filler which is a silver-based, an aluminum-based or a zinc-based brazing filler; wherein the silver-based brazing filler comprises 40~50 parts of Ag, 20~25 parts of Cu, 9~12 parts of In, 16~20 parts of Sn and 2~5 parts of Mg by weight; wherein the aluminum-based brazing filler comprises 20~25 parts of Cu, 3~8 parts of Si, 1~3 parts of Mg 0.5~2 parts of Ni and 65~80 parts of Al by weight; wherein the zinc-based brazing filler comprises 55~60 parts of Zn, 12~18 parts of Cd, 10~15 parts of Ag and 13~18 parts of Cu by weight;

(3) Assembly of object for brazing:

placing the brazing filler prepared by step (2) between the brazing surface of the upper substrate and the brazing surface of the lower substrate prepared by step (1) to form an object for brazing;

(4) Dual beam laser brazing:

Under the protection of argon atmosphere, converging the focus of two laser beams onto the object for brazing at a position which is 1~2 mm below the surface of the object for brazing, wherein a beam diameter of the laser beam is 0.5~1.5 mm and a distance between the beam center of the two laser beams is 2~5 mm; welding by the two laser beam simultaneously of which the welding speed is 15 mm/s~20 mms, wherein a power density of the laser beam at a front side is $10^2$ w/cm$^2$~$10^4$ w/cm$^2$ and a power density of the laser beam at a rear side is $10^5$ w/cm$^2$~$10^7$ w/cm$^2$, thereby the laser induced nano-brazing method for reinforced aluminum matrix composite with high volume fraction of silicon carbide particulates is achieved.

According to this embodiment, composite material science, nanotechnology and laser technology are integrated together in which the small size effect and the surface and interface effect (which increase the atomic diffusion rate) of nanotechnology is utilized, the precision heat source of laser beam which is capable of producing controllable temperature field is utilized such that a special effect of nanocrystallization on the surface of subject material is achieved while the wettability of the brazing process of reinforced aluminum matrix composite with high volume fraction of silicon carbide particulates as well as the filing capacity of the brazing filler are increased, thereby a brazed joint with high joint density and high bond strength is obtained and the stringent requirements of electronic packaging is fulfilled.

According to the laser induced nano-brazing method for reinforced aluminum matrix composite with high volume fraction of silicon carbide particulates of this embodiment of the present invention, high temperature problem is not induced while the joints shear strength can reach approximately 260 MPa, thereby the welding requirements for electronic packaging or for other materials or products which contains a large number of ceramic phase and does not allow high welding temperature can be fulfilled.

Embodiment 2

The difference between this embodiment and the embodiment 1 is that the volume fraction of reinforcing phase of silicon carbide particulates is 50%~70%. Others are the same as that of the embodiment 1.

Embodiment 3

The difference between this embodiment and the embodiment 1 or 2 is that the nanocrystalline layer on the brazing surface of the upper substrate and the brazing surface of the lower substrate is prepared by mechanical polishing, high-speed projectile injection or pulsed laser shock. Others are the same as that of the embodiment 1 or 2.

Embodiment 4

The difference between this embodiment and the embodiments 1 through 3 is that in the step (1), a thickness of the nanocrystalline layer is 30~200 μm and a grain size of the nanocrystalline layer is 5~50 nm. Others are the same as that of the embodiments 1 through 3.

Embodiment 5

The difference between this embodiment and the embodiments 1 through 4 is that in the step (1), a thickness of the upper substrate is 1~2 mm. Others are the same as that of the embodiments 1 through 4.

Embodiment 6

The difference between this embodiment and the embodiments 1 through 5 is that in the step (2), the brazing filler is in the form of a foil and has a thickness of 20~50 μm. Others are the same as that of the embodiments 1 through 5.

Embodiment 7

The difference between this embodiment and the embodiments 1 through 6 is that in the step (2), the brazing filler is in powder form and has a particle size of 10~30 μm. Others are the same as that of the embodiments 1 through 6.

Embodiment 8

The difference between this embodiment and the embodiments 1 through 7 is that, when the brazing filler prepared by the step (2) is in powder form, the brazing filler placed between the brazing surface of the upper substrate and the brazing surface of the lower substrate in the step (3) has a thickness of 20~50 μm. Others are the same as that of the embodiments 1 through 7.

Embodiment 9

The difference between this embodiment and the embodiments 1 through 8 is that, in the step (4), under the protection of argon atmosphere, converging the focus of two laser beams onto the object for brazing at a position which is 1~2 mm below the surface of the object for brazing, wherein a beam diameter of the laser beam is 0.8~1.2 mm and a distance between the beam center of the two laser beams is 3~4 mm; welding by the two laser beam simultaneously of which the welding speed is 16 mm/s~18 mms, wherein a power density of the laser beam at a front side is $1.5 \times 10^2$ w/cm$^2$~$1.5 \times 10^3$ w/cm$^2$ and a power density of the laser beam at a rear side is $1.5 \times 10^5$ w/cm$^2$~$1.5 \times 10^6$ w/cm$^2$, thereby the laser induced nano-brazing method for reinforced aluminum matrix composite with high volume fraction of silicon carbide particulates is achieved. Others are the same as that of the embodiments 1 through 8.

Embodiment 10

The difference between this embodiment and the embodiments 1 through 9 is that, in the step (4), under the protection of argon atmosphere refers to blowing argon gas to the brazing portion during the dual beam laser brazing process or carrying out the dual beam laser brazing process inside an argon gas cabinet. Others are the same as that of the embodiments 1 through 9.

The advantageous effect of the present invention is further illustrated by the following exemplary embodiments and comparative experiments.

Exemplary Embodiment 1: Refer to FIG. 1, FIG. 2, FIG. 3 and FIG. 4 of the Drawings for this Exemplary Embodiment According to this exemplary embodiment of the present invention, a laser induced nano-brazing method for reinforced aluminum matrix composite with high volume fraction of silicon carbide particulates comprises the steps of:

(1) nanocrystallization a brazing surface of substrate of reinforced aluminum matrix composite with high volume fraction of silicon carbide particulates: preparing a nanocrystalline layer on a brazing surface of an upper substrate and a brazing surface of a lower substrate respectively through a mechanical polishing process; wherein the upper substrate has a thickness of 2 mm and a volume fraction of silicon carbide of 60%; wherein the lower substrate has a thickness of 15 mm and a volume fraction of silicon carbide of 60%; in the mechanical polishing process, the diameter of projectile is 6 mm, the material of the projectile is Steel number 45, the mechanical polishing process is carried out for 60 min at a vibration frequency of 50 Hz under vacuum condition to obtain the nanocrystallized layer on the brazing surface;

(2) preparation of brazing filler: preparing a brazing filler which is a silver-based foil and has a thickness of 40 μm; where the silver-based brazing filler comprises 44.6% Ag, 23.4% Cu, 11% In, 18% Sn and 3% Mg by percentage weight;

(3) Assembly of object for brazing: placing the silver-based brazing filler foil prepared by step (2) between the brazing surface of the upper substrate and the brazing surface of the lower substrate prepared by step (1) to form the object for brazing;

(4) Dual beam laser brazing: Under the protection of argon atmosphere, converging the focus of two laser beams onto the object for brazing at a position which is 2 mm below the surface of the object for brazing, wherein a beam diameter of the laser beam is 1 mm and a distance between the beam center of the two laser beams is 3 mm; welding by the two laser beam simultaneously of which the welding speed is 15 mm/s, wherein a power density of the laser beam at a front side is $10^3$ w/cm$^2$ and a power density of the laser beam at a rear side is $10^6$ w/cm$^2$, thereby the laser induced nano-brazing method for reinforced aluminum matrix composite with high volume fraction of silicon carbide particulates is achieved.

According to this exemplary embodiment, the shear strength of the resulting joint portion is 262 MPa.

Figure 4:
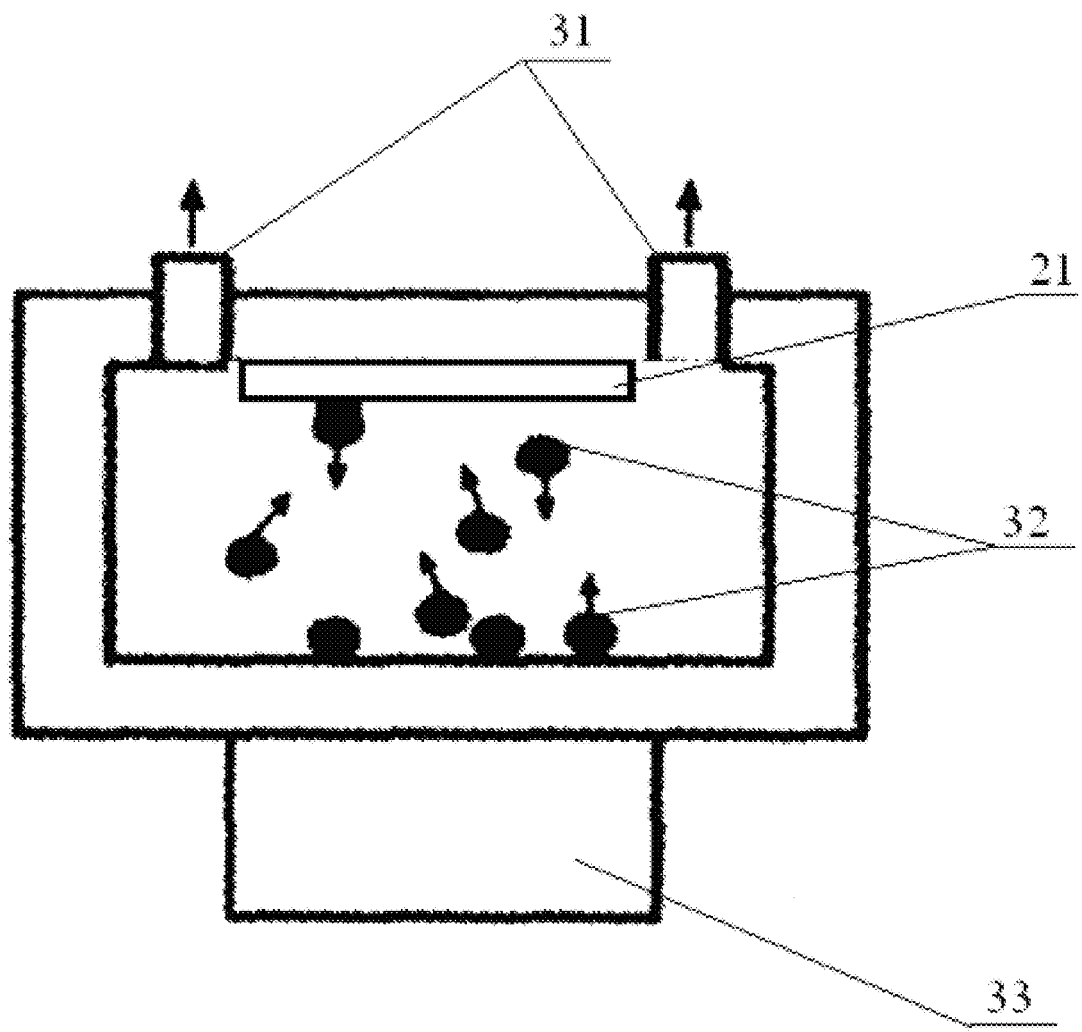
FIG. 4 is an illustration of the device for mechanical polishing process or high-speed projectile injection process to prepare a nanocrystalline layer on a brazing surface according to the present invention in which the numerical reference 31 refers to a vacuum suction hole, 32 refers to a projectile, 33 refers to a vibration generator and 21 refers to an upper substrate.

FIG. 4 is an illustration of the equipment for mechanical polishing to obtain the nanocrystalline layer on the surface for brazing; wherein the numerical reference 31 refers to a vacuum suction hole, the numerical reference 32 refers to a projectile, the numerical reference 33 refers to a vibration generator and the numerical reference 21 refers to an upper substrate. Through the vibration at the bottom of the vibration generator, the projectile spins at high speed inside the container and hit the work surface in a random manner.

Figure 2:
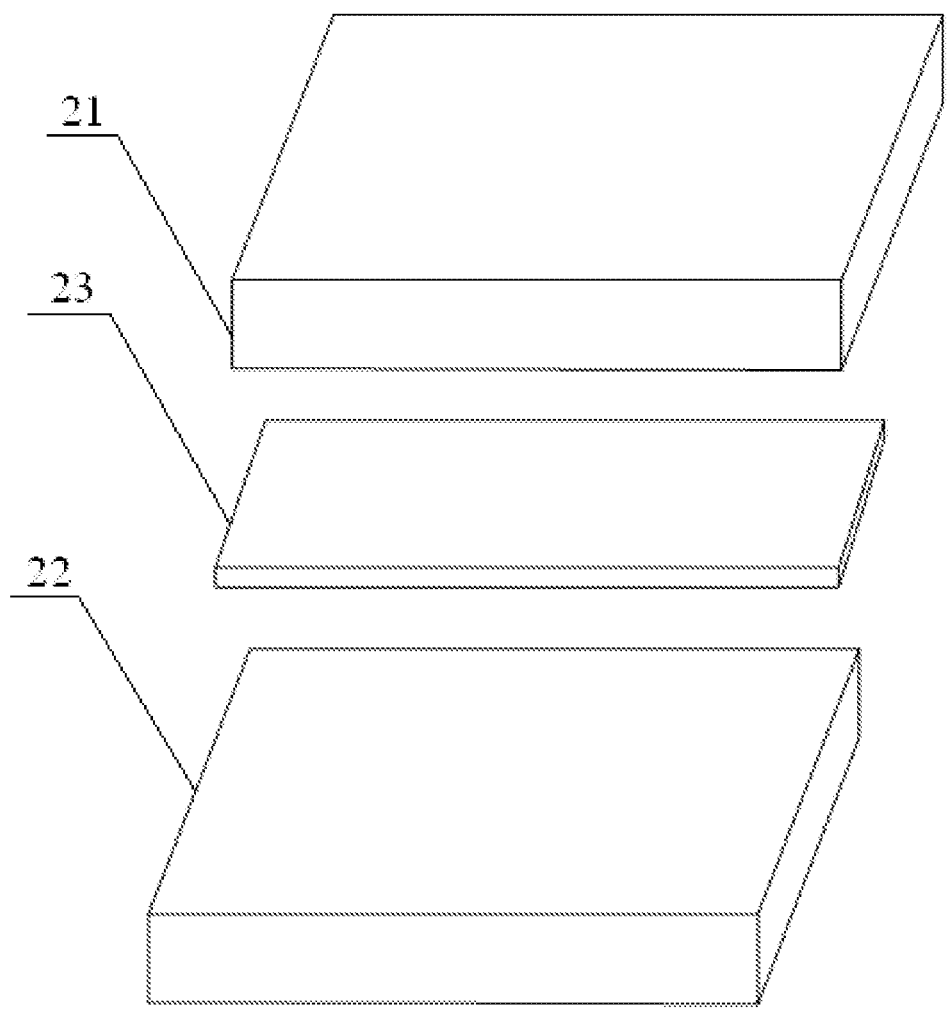
FIG. 2 is an illustration of assembly of the object for brazing according to the present invention, wherein the numerical reference 21 refers to an upper substrate, 22 refers to a lower substrate and 23 refers to a brazing filler.
Figure 3:
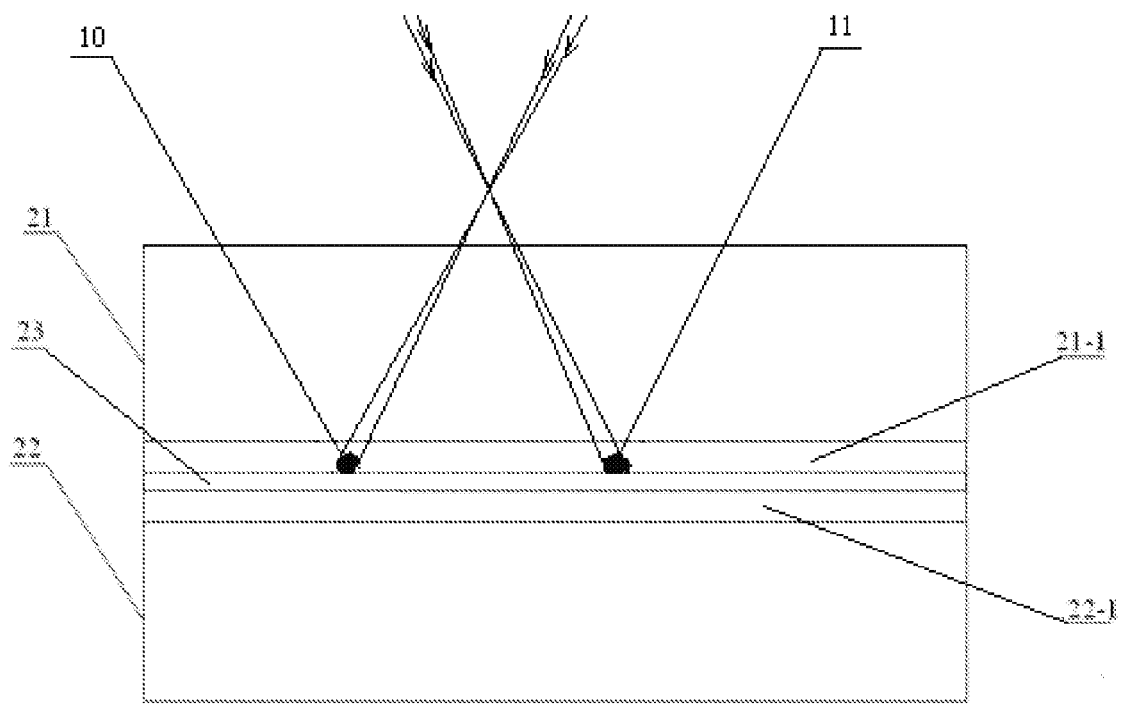
FIG. 3 is an illustration of the object for brazing during a brazing process of the present invention, wherein the numerical reference 21-1 refers to the brazing surface of the upper substrate subject to nanocrystallization, 22-1 refers to the brazing surface of the lower substrate subject to nanocrystallization, 21 refers to the upper substrate, 22 refers to the lower substrate, 23 refers to the brazing filler, 10 refers to the focus of the low-power laser beam spot at the front side and 11 refers to the focus of the high-power laser beam spot at the rear side.

Exemplary Embodiment 2: Refer to FIG. 1, FIG. 2 and FIG. 3 of the Drawings for this Exemplary Embodiment According to this exemplary embodiment of the present invention, a laser induced nano-brazing method for reinforced aluminum matrix composite with high volume fraction of silicon carbide particulates comprises the steps of: (1) nanocrystallization a brazing surface of substrate of reinforced aluminum matrix composite with high volume fraction of silicon carbide particulates: preparing a nanocrystalline layer on a brazing surface of an upper substrate and a brazing surface of a lower substrate respectively through a high-speed projectile injection process; wherein the upper substrate has a thickness of 2 mm and a volume fraction of silicon carbide of 60%; wherein the lower substrate has a thickness of 10 mm and a volume fraction of silicon carbide of 60%; in the high-speed projectile injection process, the diameter of projectile is 3 mm, the material of the projectile is Steel number 45, the high-speed projectile injection process is carried out for 6 min at a vibration frequency of 20 kHz under vacuum condition to obtain the nanocrystallized layer on the brazing surface;

(2) preparation of brazing filler: preparing a brazing filler which is an aluminum-based foil and has a thickness of 40 μm; where the aluminum-based brazing filler comprises 23% Cu, 5% Si, 1.5% Mg, 0.5% Ni and 70% Al by percentage weight;

(3) Assembly of object for brazing: placing the aluminum-based brazing filler foil prepared by step (2) between the brazing surface of the upper substrate and the brazing surface of the lower substrate prepared by step (1) to form the object for brazing;

(4) Dual beam laser brazing: Under the protection of argon atmosphere, converging the focus of two laser beams onto the object for brazing at a position which is 2 mm below the surface of the object for brazing, wherein a beam diameter of the laser beam is 1 mm and a distance between the beam center of the two laser beams is 3 mm; welding by the two laser beam simultaneously of which the welding speed is 15 mm/s, wherein a power density of the laser beam at a front side is $10^3$ w/cm$^2$ and a power density of the laser beam at a rear side is $10^6$ w/cm$^2$, thereby the laser induced nano-brazing method for reinforced aluminum matrix composite with high volume fraction of silicon carbide particulates is achieved.

According to this exemplary embodiment, the shear strength of the resulting joint portion is 254 MPa.

According to this exemplary embodiment, a high-speed projectile injection process is used to prepare the nanocrystalline layer. The mechanism of high-speed projectile injection is the same as that of mechanical polishing process except that the parameters are different.

Exemplary Embodiment 3: Refer to FIG. 1, FIG. 2 and FIG. 3 of the Drawings for this Exemplary Embodiment According to this exemplary embodiment of the present invention, a laser induced nano-brazing method for reinforced aluminum matrix composite with high volume fraction of silicon carbide particulates comprises the steps of:

(1) nanocrystallization a brazing surface of substrate of reinforced aluminum matrix composite with high volume fraction of silicon carbide particulates: preparing a nanocrystalline layer on a brazing surface of an upper substrate and a brazing surface of a lower substrate respectively through a pulsed laser shock process; wherein the upper substrate has a thickness of 2 mm and a volume fraction of silicon carbide of 60%; wherein the lower substrate has a thickness of 15 mm and a volume fraction of silicon carbide of 60%; in the pulsed laser shock process, pulsed laser shock is applied onto the brazing surface of reinforced aluminum matrix composite with high volume fraction of silicon carbide particulates to obtain the nanocrystallized layer on the brazing surface; wherein the power density peak is $10^9$ W/cm$^2$ and the pulse duration for each pulse action is 30 ns.

(2) preparation of brazing filler: preparing a brazing filler which is a zinc-based foil and has a thickness of 40 μm; where the zinc-based brazing filler comprises 57% Zn, 15% Cd, 12% Ag and 16% Cu by percentage weight;

(3) Assembly of object for brazing: placing the zinc-based brazing filler foil prepared by step (2) between the brazing surface of the upper substrate and the brazing surface of the lower substrate prepared by step (1) to form the object for brazing;

(4) Dual beam laser brazing: Under the protection of argon atmosphere, converging the focus of two laser beams onto the object for brazing at a position which is 2 mm below the surface of the object for brazing, wherein a beam diameter of the laser beam is 1 mm and a distance between the beam center of the two laser beams is 3 mm; welding by the two laser beam simultaneously of which the welding speed is 15 mm/s, wherein a power density of the laser beam at a front side is $10^3$ w/cm$^2$ and a power density of the laser beam at a rear side is $10^6$ w/cm$^2$, thereby the laser induced nano-brazing method for reinforced aluminum matrix composite with high volume fraction of silicon carbide particulates is achieved.

According to this exemplary embodiment, the shear strength of the resulting joint portion is 258 MPa.

Exemplary Embodiment 4: Refer to FIG. 1, FIG. 2 and FIG. 3 of the Drawings for this Exemplary Embodiment According to this exemplary embodiment of the present invention, a laser induced nano-brazing method for reinforced aluminum matrix composite with high volume fraction of silicon carbide particulates comprises the steps of:

(1) nanocrystallization a brazing surface of substrate of reinforced aluminum matrix composite with high volume fraction of silicon carbide particulates: preparing a nanocrystalline layer on a brazing surface of an upper substrate and a brazing surface of a lower substrate respectively through a pulsed laser shock process; wherein the upper substrate has a thickness of 2 mm and a volume fraction of silicon carbide of 70%; wherein the lower substrate has a thickness of 15 mm and a volume fraction of silicon carbide of 70%; in the pulsed laser shock process, pulsed laser shock is applied onto the brazing surface of reinforced aluminum matrix composite with high volume fraction of silicon carbide particulates to obtain the nanocrystallized layer on the brazing surface; wherein the power density peak is $10^9$ W/cm$^2$ and the pulse duration for each pulse action is 30 ns.

(2) preparation of brazing filler: preparing a brazing filler which is a zinc-based powder and has a particle size of 10~30 μm; wherein the zinc-based brazing filler powder comprises 57% Zn, 15% Cd, 12% Ag and 16% Cu by percentage weight;

(3) Assembly of object for brazing: placing the zinc-based brazing filler powder prepared by step (2) between the brazing surface of the upper substrate and the brazing surface of the lower substrate prepared by step (1) to form the object for brazing; wherein the zinc-based brazing filler powder has a thickness of 40 μm;

(4) Dual beam laser brazing: Under the protection of argon atmosphere, converging the focus of two laser beams onto the object for brazing at a position which is 2 mm below the surface of the object for brazing, wherein a beam diameter of the laser beam is 1 mm and a distance between the beam center of the two laser beams is 2 mm; welding by the two laser beam simultaneously of which the welding speed is 16 mm/s, wherein a power density of the laser beam at a front side is $10^2$ w/cm$^2$ and a power density of the laser beam at a rear side is $10^5$ w/cm$^2$, thereby the laser induced nano-brazing method for reinforced aluminum matrix composite with high volume fraction of silicon carbide particulates is achieved.

According to this exemplary embodiment, the shear strength of the resulting joint portion is 254 MPa.

Exemplary Embodiment 5: Refer to FIG. 1, FIG. 2 and FIG. 3 of the Drawings for this Exemplary Embodiment According to this exemplary embodiment of the present invention, a laser induced nano-brazing method for reinforced aluminum matrix composite with high volume fraction of silicon carbide particulates comprises the steps of:

(1) nanocrystallization a brazing surface of substrate of reinforced aluminum matrix composite with high volume fraction of silicon carbide particulates: preparing a nanocrystalline layer on a brazing surface of an upper substrate and a brazing surface of a lower substrate respectively through a pulsed laser shock process; wherein the upper substrate has a thickness of 2 mm and a volume fraction of silicon carbide of 50%; wherein the lower substrate has a thickness of 15 mm and a volume fraction of silicon carbide of 50%; in the pulsed laser shock process, pulsed laser shock is applied onto the brazing surface of reinforced aluminum matrix composite with high volume fraction of silicon carbide particulates to obtain the nanocrystallized layer on the brazing surface; wherein the laser power density is $10^8$V/cm$^2$ and the duration is 30 ns; wherein the power density is $10^9$ W/cm$^2$ and the pulse duration for each pulse action is 30 ns.

(2) preparation of brazing filler: preparing a brazing filler which is a aluminum-based powder and has a particle size of 10~30 μm; wherein the aluminum-based brazing filler comprises 23% Cu, 5% Si, 1.5% Mg, 0.5% Ni and 70% Al by percentage weight;

(3) Assembly of object for brazing: placing the aluminum-based brazing filler powder prepared by step (2) between the brazing surface of the upper substrate and the brazing surface of the lower substrate prepared by step (1) to form the object for brazing; wherein the aluminum-based brazing filler powder has a thickness of 40 μm;

(4) Dual beam laser brazing: Under the protection of argon atmosphere, converging the focus of two laser beams onto the object for brazing at a position which is 2 mm below the surface of the object for brazing, wherein a beam diameter of the laser beam is 1.5 mm and a distance between the beam center of the two laser beams is 5 mm; welding by the two laser beam simultaneously of which the welding speed is 17 mm/s, wherein a power density of the laser beam at a front side is $10^4$ w/cm$^2$ and a power density of the laser beam at a rear side is $10^7$ w/cm$^2$, thereby the laser induced nano-brazing method for reinforced aluminum matrix composite with high volume fraction of silicon carbide particulates is achieved.

According to this exemplary embodiment, the shear strength of the resulting joint portion is 265 MPa.

According to the laser induced nano-brazing method for reinforced aluminum matrix composite with high volume fraction of silicon carbide particulates of the present invention, high temperature is not induced by the brazing process and the shear strength of the resulting joint portion can reach approximately 260 MPa, thereby the welding requirements for electronic packaging or for other materials or products which contains a large number of ceramic phase and does not allow high welding temperature can be fulfilled completely.

One skilled in the art will understand that the embodiment of the present invention as shown in the drawings and described above is exemplary only and not intended to be limiting.

It will thus be seen that the objects of the present invention have been fully and effectively accomplished. It embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A laser-induced nano-brazing method for reinforced aluminum matrix composite with a volume fraction of silicon carbide particulates, characterized in that, said laser-induced nano-brazing method for reinforced aluminum matrix composite with the volume fraction of silicon carbide particulates comprises the steps of:

(1) carrying out nanocrystallization for a brazing surface of a substrate of reinforced aluminum matrix composite with the volume fraction of silicon carbide particulates through which a nanocrystalline layer on the brazing surface of an upper substrate and a nanocrystalline layer on the brazing surface of a lower substrate are formed, wherein the upper substrate and the lower substrate are reinforced aluminum matrix composite with the volume fraction of silicon carbide particulates;

(2) preparing a brazing filler in which the brazing filler is a silver-based brazing filler, an aluminum-based brazing filler or a zinc-based brazing filler, wherein the silver-based brazing filler comprises 40~50 parts of Ag, 20~25 parts of Cu, 9~12 parts of In, 16~20 parts of Sn and 2~5 parts of Mg by weight; wherein the aluminum-based brazing filler comprises 20~25 parts of Cu, 3~8 parts of Si, 1~3 parts of Mg 0.5~2 parts of Ni and 65~80 parts of Al by weight; wherein the zinc-based brazing filler comprises 55~60 parts of Zn, 12~18 parts of Cd, 10~15 parts of Ag and 13~18 parts of Cu by weight;

(3) assembling an object for brazing in which the brazing filler prepared by the step (2) is placed between the brazing surface of the upper substrate and the brazing surface of the lower substrate prepared by the step (1) to form the object for brazing;

(4) carrying out dual beam laser brazing of which under protection of argon atmosphere, converging the focus of two laser beams onto the object for brazing at a position which is 1~2 mm below a surface of the object for brazing, wherein a beam diameter of the laser beam is 0.5~1.5 mm and a distance between the beam center of the two laser beams is 2~5 mm; brazing by the two laser beams simultaneously in which the brazing speed is 15 mm/s~20 mms, wherein a power density of the laser beam at a front side is $10^2$ w/cm$^2$~$10^4$ w/cm$^2$ and a power density of the laser beam at a rear side is $10^5$ w/cm$^2$~$10^7$ w/cm$^2$, thereby achieving the laser-induced nano-brazing method for reinforced aluminum matrix composite with the volume fraction of silicon carbide particulates.

2. The laser-induced nano-brazing method for reinforced aluminum matrix composite with the volume fraction of silicon carbide particulates according to claim 1, characterized in that, a volume fraction of reinforcing phase of silicon carbide particulates is 50%-70% in the reinforced aluminum matrix composite with the volume fraction of silicon carbide particulates.

3. The laser-induced nano-brazing method for reinforced aluminum matrix composite with the volume fraction of silicon carbide particulates according to claim 1, characterized in that, the nanocrystalline layer on the brazing surface of the upper substrate and the nanocrystalline layer on the brazing surface of the lower substrate are prepared by using a mechanical polishing method, a projectile injection method or a pulsed laser shock method.

4. The laser-induced nano-brazing method for reinforced aluminum matrix composite with the volume fraction of silicon carbide particulates according to claim 3, characterized in that, the nanocrystalline layer prepared by the step (1) has a thickness of 30~200 μm and a grain size of 5~50 nm.

5. The laser-induced nano-brazing method for reinforced aluminum matrix composite with the volume fraction of silicon carbide particulates according to claim 4, characterized in that, the upper substrate in the step (1) has a thickness of 1~2 mm.

6. The laser-induced nano-brazing method for reinforced aluminum matrix composite with the volume fraction of silicon carbide particulates according to claim 1, characterized in that, the brazing filler in the step (2) has a foil form and has a thickness of 20~50 μm.

7. The laser-induced nano-brazing method for reinforced aluminum matrix composite with the volume fraction of silicon carbide particulates according to claim 1, characterized in that, the brazing filler has a powder form and has a particle size of 10~30 μm.

8. The laser-induced nano-brazing method for reinforced aluminum matrix composite with the volume fraction of silicon carbide particulates according to claim 7, characterized in that, the brazing filler placed between the brazing surface of the upper substrate and the brazing surface of the lower substrate in the step (3) has a thickness of 20~50 μm if the brazing filler is in powder form.

9. The laser-induced nano-brazing method for reinforced aluminum matrix composite with the volume fraction of silicon carbide particulates according to claim 6, characterized in that, the step (4) is: carrying out dual beam laser brazing of which under protection of argon atmosphere, converging the focus of two laser beams onto the object for brazing at a position which is 1~2 mm below a surface of the object for brazing, wherein a beam diameter of the laser beam is 0.8~1.2 mm and a distance between the beam center of the two laser beams is 3~4 mm; brazing by the two laser beams simultaneously in which the brazing speed is 16 mm/s~18 mms, wherein a power density of the laser beam at a front side is $1.5\times10^2$ w/cm$^2$~$1.5\times10^3$ w/cm$^2$ and a power density of the laser beam at a rear side is $1.5\times10^5$ w/cm$^2$~$1.5\times10^6$ w/cm$^2$, thereby achieving the laser-induced nano-brazing method for reinforced aluminum matrix composite with the volume fraction of silicon carbide particulates.

10. The laser-induced nano-brazing method for reinforced aluminum matrix composite with the volume fraction of silicon carbide particulates according to claim 1, characterized in that, under the protection of argon atmosphere in the step (4) refers to blowing argon gas to a brazing portion during the process of dual beam laser brazing or carrying out the process of dual beam laser brazing inside an argon gas cabinet.

11. The laser-induced nano-brazing method for reinforced aluminum matrix composite with the volume fraction of silicon carbide particulates according to claim 2, characterized in that, the nanocrystalline layer on the brazing surface of the upper substrate and the nanocrystalline layer on the brazing surface of the lower substrate are prepared by using a mechanical polishing method, a projectile injection method or a pulsed laser shock method.

12. The laser-induced nano-brazing method for reinforced aluminum matrix composite with the volume fraction of silicon carbide particulates according to claim 11, characterized in that, the nanocrystalline layer prepared by the step (1) has a thickness of 30~200 μm and a grain size of 5~50 nm.

13. The laser-induced nano-brazing method for reinforced aluminum matrix composite with the volume fraction of silicon carbide particulates according to claim 12, characterized in that, the upper substrate in the step (1) has a thickness of 1~2 mm.

14. The laser-induced nano-brazing method for reinforced aluminum matrix composite with the volume fraction of silicon carbide particulates according to claim 7, characterized in that, the step (4) is: carrying out dual beam laser brazing of which under protection of argon atmosphere, converging the focus of two laser beams onto the object for brazing at a position which is 1~2 mm below a surface of the object for brazing, wherein a beam diameter of the laser beam is 0.8~1.2 mm and a distance between the beam center of the two laser beams is 3~4 mm; brazing by the two laser beams simultaneously in which the brazing speed is 16 mm/s~18 mms, wherein a power density of the laser beam at a front side is $1.5\times10^2$ w/cm$^2$~$1.5\times10^3$ w/cm$^2$ and a power density of the laser beam at a rear side is $1.5\times10^5$ w/cm$^2$~$1.5\times10^6$ w/cm$^2$, thereby achieving the laser-induced nano-brazing method for reinforced aluminum matrix composite with the volume fraction of silicon carbide particulates.

15. The laser-induced nano-brazing method for reinforced aluminum matrix composite with the volume fraction of silicon carbide particulates according to claim 8, characterized in that, the step (4) is: carrying out dual beam laser brazing of which under protection of argon atmosphere, converging the focus of two laser beams onto the object for brazing at a position which is 1~2 mm below a surface of the object for brazing, wherein a beam diameter of the laser beam is 0.8~1.2 mm and a distance between the beam center of the two laser beams is 3~4 mm; brazing by the two laser beams simultaneously in which the brazing speed is 16 mm/s~18 mms, wherein a power density of the laser beam at a front side is $1.5\times10^2$ w/cm$^2$~$1.5\times10^3$ w/cm$^2$ and a power density of the laser beam at a rear side is $1.5\times10^5$ w/cm$^2$~$1.5\times10^6$ w/cm$^2$, thereby achieving the laser-induced nano-brazing method for reinforced aluminum matrix composite with the volume fraction of silicon carbide particulates.

16. The laser-induced nano-brazing method for reinforced aluminum matrix composite with the volume fraction of silicon carbide particulates according to claim 4, characterized in that, under the protection of argon atmosphere in the step (4) refers to blowing argon gas to a brazing portion during the process of dual beam laser brazing or carrying out the process of dual beam laser brazing inside an argon gas cabinet.

17. The laser-induced nano-brazing method for reinforced aluminum matrix composite with the volume fraction of silicon carbide particulates according to claim 5, characterized in that, under the protection of argon atmosphere in the step (4) refers to blowing argon gas to a brazing portion during the process of dual beam laser brazing or carrying out the process of dual beam laser brazing inside an argon gas cabinet.

18. The laser-induced nano-brazing method for reinforced aluminum matrix composite with the volume fraction of silicon carbide particulates according to claim 12, characterized in that, under the protection of argon atmosphere in the step (4) refers to blowing argon gas to a brazing portion during the process of dual beam laser brazing or carrying out the process of dual beam laser brazing inside an argon gas cabinet.

19. The laser-induced nano-brazing method for reinforced aluminum matrix composite with the volume fraction of silicon carbide particulates according to claim 13, characterized in that, under the protection of argon atmosphere in the step (4) refers to blowing argon gas to a brazing portion during the process of dual beam laser brazing or carrying out the process of dual beam laser brazing inside an argon gas cabinet.

* * * * *